(12) United States Patent
Ooba (10) Patent No.: US 12,417,199 B2
(45) Date of Patent: Sep. 16, 2025

(54) SEMICONDUCTOR DEVICE AND CONTROL METHOD OF THE SAME (71) Applicant: Renesas Electronics Corporation, Tokyo (JP)

(72) Inventor: Tetsuya Ooba, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 31 days.

(21) Appl. No.: 18/588,277

(22) Filed: Feb. 27, 2024

(65) Prior Publication Data
US 2024/0320175 A1 Sep. 26, 2024

(30) Foreign Application Priority Data

Mar. 24, 2023 (JP) ................. 2023-047642

(51) Int. Cl.
G06F 13/362 (2006.01)
G06F 13/16 (2006.01)
G06F 13/30 (2006.01)

(52) U.S. Cl.
CPC ........ *G06F 13/362* (2013.01); *G06F 13/1678* (2013.01); *G06F 13/30* (2013.01)

(58) Field of Classification Search
None
See application file for complete search history.

(56) References Cited

U.S. PATENT DOCUMENTS

| 11,249,722 B2 | 2/2022 | Fujii et al. | |
| 2011/0022756 A1* | 1/2011 | Catherwood | G06F 13/1605 710/116 |
| 2012/0054484 A1* | 3/2012 | Matsumoto | H04N 1/40 713/100 |
| 2012/0192006 A1* | 7/2012 | Qi | G06F 11/2071 714/E11.089 |

FOREIGN PATENT DOCUMENTS

JP 2019-219753 A 12/2019

* cited by examiner

*Primary Examiner* — Michael Sun
(74) *Attorney, Agent, or Firm* — Rimon P.C.

(57) ABSTRACT

A semiconductor device capable of suppressing reduction in performance is provided. The semiconductor device includes: a processor; a DR processor including a DMA controller; a system memory; an internal bus to which the processor, the DR processor, and the system memory are connected; and a bus arbiter connected to the processor and the DR processor, the bus arbiter executing arbitration between access to the system memory by the processor and access to the system memory by the DMA controller in accordance with a predetermined priority order. Here, the DR processor includes a frequency circuit determining a frequency at which the access to the system memory by the DMA controller is not permitted by the arbitration made by the bus arbiter.

10 Claims, 10 Drawing Sheets

SEMICONDUCTOR DEVICE AND CONTROL METHOD OF THE SAME

CROSS-REFERENCE TO RELATED APPLICATION

The disclosure of Japanese Patent Application No. 2023-047642 filed on Mar. 24, 2023, including the specification, drawings and abstract is incorporated herein by reference in its entirety.

BACKGROUND

The present invention relates to a semiconductor device and a control method of the same, and relates to a semiconductor device equipped with, for example, a dynamically reconfigurable processor (hereinafter also referred to as a DR processor) that is dynamically reconfigurable, and a control method of the same.

There is disclosed technique listed below.
[Patent Document 1] Japanese Unexamined Patent Application Publication No. 2019-219753

The semiconductor device equipped with the DR processor is described in, for example, the Patent Document 1. The Patent Document 1 describes a technique of achieving efficient arithmetic processing using the DR processor and an accelerator.

SUMMARY

The present inventors have examined achievement of a semiconductor device capable of executing image processing and artificial intelligence (AI) inference in parallel using a central processor (hereinafter simply referred to as a processor), a DR processor, and an image processing circuit. As application of such a semiconductor device, on-vehicle semiconductor device is exemplified. By using such a semiconductor device, it is possible to use AI inference to determine whether a person is present in an image being captured by an on-vehicle camera while displaying the image on a display.

In such a semiconductor device, the processor, the DR processor, and the image processing circuit are configured to be, for example, connected to a common bus. At the time of execution of the AI processing and the image processing, the processor, the DR processor, and the image processing circuit function as bus masters for access (memory access) to a system memory connected to the common bus.

A large amount of memory access is generated in the AI processing and the image processing. Therefore, in order to execute such processing at a high speed, it is necessary to increase a bandwidth of the common bus sufficiently. For example, when the image is input from the on-vehicle camera and the image at 30 frames per second (30 fps) is displayed on the display by the image processing circuit while the AI inference is executed by the DR processor, if the bandwidth of the common bus is insufficient, the image processing circuit, the DR processor, or the processor may need to wait for the memory access. The present inventors have found that the performance of the semiconductor device is reduced by the occurrence of the memory access wait, which results in a problem that is difficulty in continuous displaying of the image on the display at, for example, 30 fps.

The bandwidth of the common bus is not recognized in the Patent Document 1, and the above-described problem is not described in the Patent Document 1, either.

The outline of the typical aspects of the inventions disclosed in the present application will be briefly described as follows.

That is, the semiconductor device includes: a processor; a DR processor equipped with a DMA controller; a memory; a bus to which the processor, the DR processor, and the memory are connected; and a bus arbiter that is connected to the processor and the DR processor and that executes arbitration between access to the memory by the processor and access to the memory by the DMA controller in accordance with a predetermined priority order. Here, the DR processor includes a frequency circuit that determines a frequency at which the access to the memory by the DMA controller was not allowed by the arbitration made by the bus arbiter.

Other objects and novel characteristics will be apparent from the description of the present specification and the accompanying drawings.

According to an embodiment, a semiconductor device capable of suppressing reduction of performance can be provided.

DETAILED DESCRIPTION

The following is explanation for each embodiment of the present invention with reference to drawings. Note that only one example is disclosed, and appropriate modification with keeping the idea of the present invention which can be anticipated by those who are skilled in the art is obviously within the scope of the present invention.

In the present specification and each drawing, similar elements to those described earlier for the already-described drawings are denoted with the same reference symbol, and detailed explanation for them is appropriately omitted in some cases.

First Embodiment

<Configuration of a Semiconductor Device>

Figure 1:
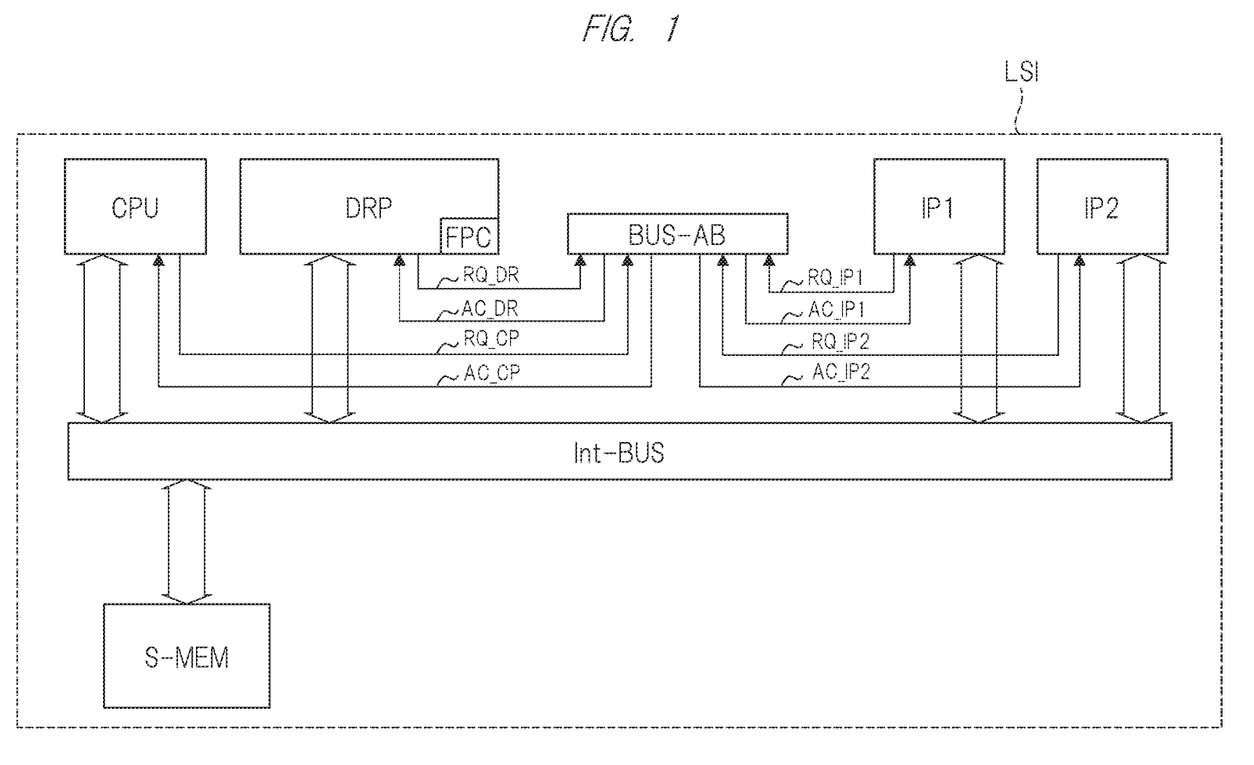
FIG. 1 is a block diagram showing a configuration of a semiconductor device according to the first embodiment.

FIG. 1 is a block diagram showing a configuration of a semiconductor device according to the first embodiment. In FIG. 1, a symbol "LSI" illustrated with a dashed line indicates a semiconductor device. Although not particularly limited, the semiconductor device LSI according to the first embodiment is formed on a single semiconductor chip by a well-known semiconductor manufacturing technique. The semiconductor device LSI includes various circuit blocks. However, only the circuit blocks necessary for explanation are shown in FIG. 1.

The semiconductor device LSI includes a processor CPU, a DR processor DRP, a bus arbiter BUS-AB, image processing circuits IP1 and IP2, an internal bus (common bus) Int-BUS, and a system memory S-MEM. As shown in FIG. 1, the processor CPU, the DR processor DRP, the image processing circuits IP1 and IP2, and the system memory S-MEM are commonly connected to the internal bus Int-BUS. The processor CPU, the DR processor DRP, and the image processing circuits IP1 and IP2 function as bus masters, execute access (memory access) to the system memory S-MEM via the internal bus Int-BUS to execute write data to or read data from the system memory S-MEM.

For example, the processor CPU operates in accordance with a program not illustrated. In this operation, the processor CPU accesses the system memory S-MEM via the internal bus Int-BUS and writes data to or read data from the system memory S-MEM.

The image processing circuits IP1 and IP2 also access the system memory S-MEM via the internal bus Int-BUS to write or read data at the time of image processing such as image input and image output. Although not particularly limited, the image processing circuits IP1 and IP2 in the first embodiment are each made of an intellectual property (IP) core so that the image processing circuit IP1 is the IP core that executes processing related to the image input while the image processing circuit IP2 is the IP core that executes processing related to the image output.

The DR processor DRP will be explained later with reference to drawings, and therefore, a detailed explanation thereof is omitted here. However, the DR processor DRP also accesses the system memory S-MEM via the internal bus Int-BUS to write or read data when executing processing.

As described above, each of the processor CPU, the DR processor DRP, and the image processing circuits IP1 and IP2 functions as the bus master, and therefore, the semiconductor device LSI includes a bus arbiter BUS-AB that executes arbitration among the accesses of these components to the system memory S-MEM. Bus request signals RQ_CP, RQ_DR, RQ_IP1, and RQ_IP2 are supplied to the bus arbiter BUS-AB from the processor CPU, the DR processor DRP, and the image processing circuits IP1 and IP2, respectively, and the bus arbiter BUS-AB outputs bus permission signals AC_CP, AC_DR, AC_IP1, and AC_IP2 to the processor CPU, the DR processor DRP, and the image processing circuits IP1 and IP2, respectively, in accordance with a predetermined priority order.

That is, when accessing the system memory S-MEM, the processor CPU outputs the bus request signal RQ_CP to the bus arbiter BUS-AB. In response to the bus request signal RQ_CP, the bus arbiter BUS-AB outputs the bus permission signal AC_CP. If the output bus permission signal AC_CP indicates access permission, the processor CPU accesses the system memory S-MEM. If the output bus permission signal AC_CP indicates access denial (not permitting the access), the processor CPU waits for the access to the system memory S-MEM until the bus permission signal AC_CP indicates the access permission.

As similar to the processor CPU, when accessing the system memory S-MEM, the DR processor DRP also outputs the bus request signal RQ_DR to the bus arbiter BUS-AB. In response to the bus request signal RQ_DR, the bus arbiter BUS-AB outputs the bus permission signal AC_DR. If the output bus permission signal AC_DR indicates access permission, the DR processor DRP accesses the system memory S-MEM. In contrast, if the output bus permission signal AC_DR indicates access denial (not permitting the access), the DR processor DRP waits for the access to the system memory S-MEM until the bus permission signal AC_DR indicates the access permission.

As similar to the processor CPU and the DR processor DRP, the image processing circuits IP1 and IP2 make an access request to the bus arbiter BUS-AB with bus request signals RQ_IP1 and RQ_IP2, and then, execute the access if the bus permission signals AC_IP1 and AC_IP2 from the bus arbiter BUS-AB indicate the access permission.

In FIG. 1, a symbol FPC shown in the DR processor DRP indicates a frequency circuit. The frequency circuit FPC will be described later, and therefore, the description thereof is omitted here.

<Configuration of DR Processor>

Figure 2A:
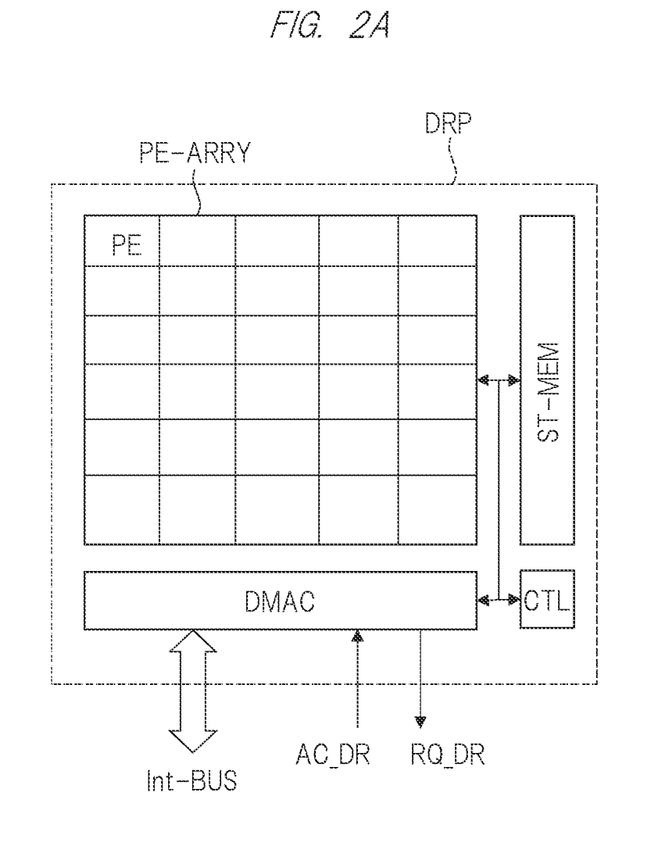
FIG. 2A is a block diagram showing a configuration of a DR processor according to the first embodiment.
Figure 2B:
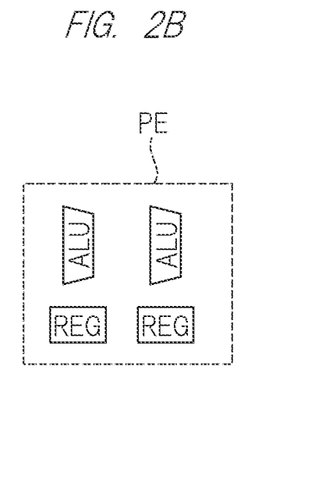
FIG. 2B is a block diagram showing a configuration of a DR processor according to the first embodiment.

Next, a configuration of the DR processor DRP shown in FIG. 1 is described with reference to the drawings. FIG. 2 is a block diagram showing the configuration of the DR processor according to the first embodiment. FIG. 2A is a block diagram showing the configuration of the DR processor, and FIG. 2B is a block diagram showing a configuration of a programmable circuit used in the DR processor.

As shown in FIG. 2A, the DR processor DRP includes a program array PE-ARRY made of a plurality of programmable circuits PE arranged in an array, a state memory ST-MEM that stores state information, a direct memory access (DMA) controller DMAC, and a control circuit CTL. In FIG. 2A, in order to avoid the drawings from being complicated, a symbol PE is added to only one programmable circuit arranged in the program array PE-ARRY.

A plurality of programmable circuits PE arranged in the program array PE-ARRY are connected via a switch not illustrated.

The plurality of programmable circuits PE have mutually the same configuration. That is, as shown in FIG. 2B, each programmable circuit PE includes a plurality of arithmetic units ALU and registers REG, and connection between the arithmetic units ALU and connection between the arithmetic unit ALU and register REG are made by switches not illustrated.

The switch between the programmable circuits PEs arranged in the program array PE-ARRY and the switches arranged in the respective programmable circuit PE (between the arithmetic unit ALUs and between the arithmetic unit ALUs and registers) are controlled by the state information described later. Also, the functions of the arithmetic unit ALU is also defined by the state information.

A plurality of pieces of state information are stored in the state memory ST-MEM. The state information is selected from among the plurality of pieces of state information in a predetermined order by the control circuit CTL. By the selected state information, the switch connected between the programmable circuits PE and the switch in the programmable circuit PE are controlled. Also, by the selected state information, the function of the arithmetic unit ALU arranged in the programmable circuit PE is defined.

The selected state information represents a state of the circuit that is achieved by the program array PE-ARRY in a certain period of time. That is, the selected state information represents a state in states (state transition) of a circuit that changes with time. When the control circuit CTL sequentially selects a plurality of pieces of state information stored in the state memory ST-MEM, a circuit based on the state transition is made of the plurality of programmable circuits PE arranged in the program array PE-ARRY.

The DMA controller DMAC transfers data between the program array PE-ARRY and the system memory S-MEM via the internal bus Int-BUS. For the data transfer, the DMA controller DMAC outputs the bus request signal RQ_DR shown in FIG. 1 to the bus arbiter BUS-AB (FIG. 1), and receives the bus permission signal AC_DR as input from the bus arbiter BUS-AB.

For example, in order to achieve a circuit that executes a predetermined arithmetic operation in the program array PE-ARRY, data for executing the predetermined arithmetic operation is transferred from the system memory S-MEM to the program array PE-ARRY by the DMA controller DMAC. In addition, intermediate data generated in the program array PE-ARRY during the execution of the predetermined arithmetic operation is transferred between the system memory S-MEM and the program array PE-ARRY by the DMA controller DMAC. Furthermore, when the predetermined arithmetic operation ends, the data resulting from the arithmetic operation obtained in the program array PE-ARRY is transferred from the program array PE-ARRY to the system memory S-MEM by the DMA controller DMAC. In such data transfer, the arbitration is executed by the bus arbiter BUS-AB as shown in FIG. 1. For this reason, only when the bus arbiter BUS-AB permits the DR processor DRP, in other words, the DMA controller DMAC to execute the access, the DMAC controller DMAC transfers the data (including the intermediate data) between the program array PE-ARRY and the system memory S-MEM.

Although not particularly limited, the plurality of pieces of state information stored in the state memory ST-MEM is previously stored in the system memory S-MEM, and the processor CPU (FIG. 1) reads the plurality of pieces of state information from the system memory S-MEM, and stores the information into the state memory ST-MEM. Of course, instead of the processor CPU, the DMAC controller DMAC may transfer the plurality of pieces of state information previously stored in the system memory S-MEM to the state memory ST-MEM, and store the information into the state memory ST-MEM.

Note that FIG. 2A does not show the frequency circuit FPC shown in FIG. 1. In the first embodiment, the frequency circuit FPC is achieved by the program array PE-ARRY in accordance with the selected state information.

<Operation of DR Processor>

Figure 3:
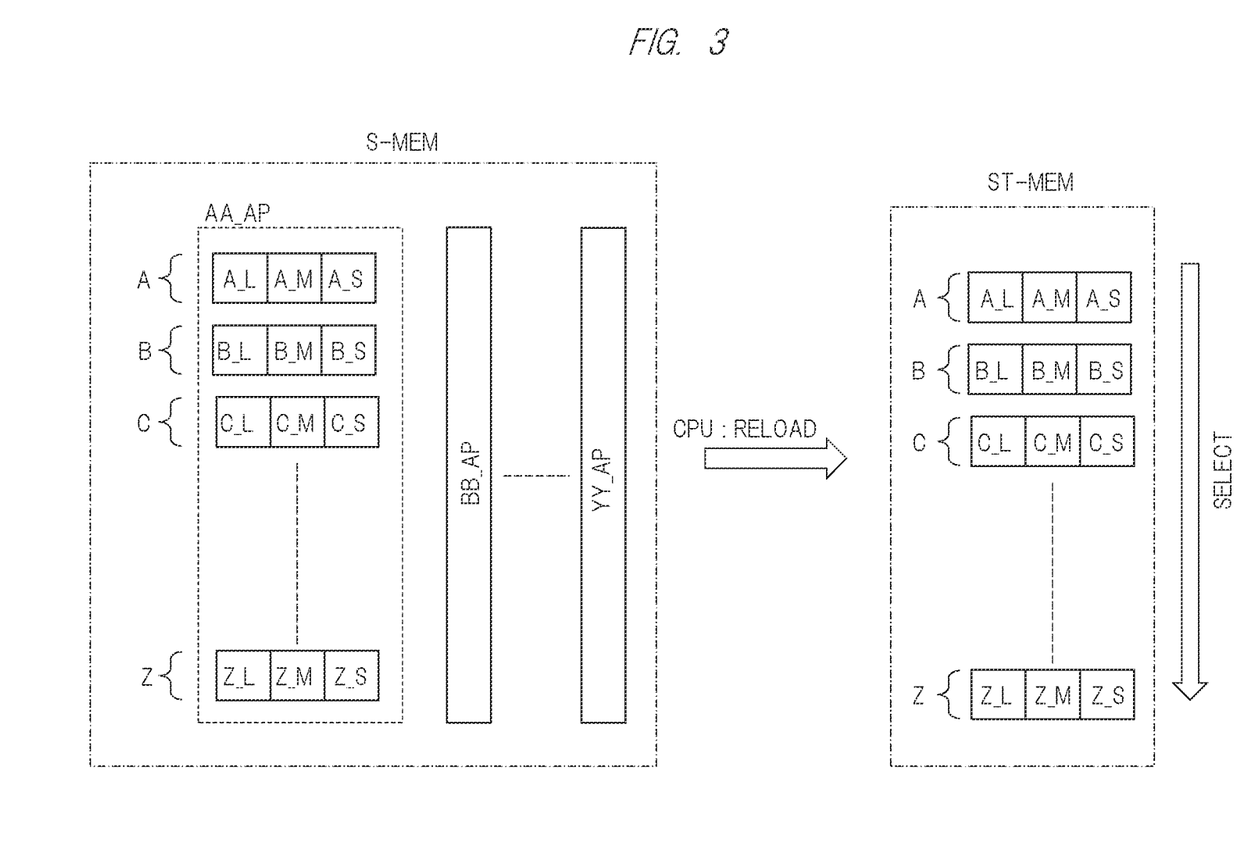
FIG. 3 is a diagram for explaining an operation of the DR processor according to the first embodiment.

Next, an operation of the DR processor DRP is explained with reference to the drawings. FIG. 3 is a diagram for explaining the operation of the DR processor according to the first embodiment.

An example described herein is in a case in which circuit information AA_AP to circuit information YY_AP are stored in the system memory S-MEM so that circuits AA to YY having a mutually different configuration can be achieved by the DR processor DRP. The circuit information AA_AP is made of a plurality of pieces of state information for achieving a function A to a function Z that change with the lapse of time. Although not illustrated, the same applies to each piece of the circuit information BB_AP to YY_AP, and therefore, the circuit information AA_AP is explained as an example.

In the first embodiment, three types of circuits for achieving the function A are prepared. That is, three pieces of state information A_L, A_M, and A_S which achieve three types of mutually different circuits are prepared as the state information for achieving one function A. In the function B to the function Z, as similar to the function A, three pieces of state information B_L, B_M, B_S to Z_L, Z_M and Z_S are prepared as the state information for achieving their respective functions.

In order to achieve a desired circuit by the DR processor DRP, the processor CPU selects the circuit information corresponding to the desired circuit from among the circuit information AA_AP to YY_AP stored in the system memory S-MEM, and transfers (reloads) it to the state memory ST-MEM of the DR processor DRP. FIG. 3 shows the case where the circuit information AA_AP has been reloaded as the circuit information corresponding to the desired circuit.

By the reloading, the state information A_L, A_M, A_S to Z_L, Z_M, Z_S configuring the circuit information AA_AP stored in the state memory ST-MEM of the DR processor DRP are selected by the control circuit CTL and the frequency circuit FPC (FIG. 1) of the DR processor DRP. That is, the pieces of state information A_L, A_M, A_S to Z_L, Z_M, Z_S are selected in the order of the function A to the function Z, and then, one piece of state information is selected from among the three pieces of state information (for example, pieces of state information A_L, A_M, and A_S).

That is, pieces of state information A_L, A_M, and A_S corresponding to the function A are selected first, and then, one piece of state information (for example, A_L) is further selected from among the selected three pieces of state information. In accordance with the selected state information A_L, the state of the switch between the plurality of programmable circuits PE arranged in the program array PE-ARRY and the state of the switch in each programmable circuit PE are set. In addition, the function of the arithmetic unit ALU or the like in each programmable circuit PE is also defined in accordance with the state information A_L. In the manner, a circuit based on the state information A_L (a circuit that achieves the function A) is achieved by the program array PE-ARRY. Next, the three pieces of state information B_L, B_M, and B_S corresponding to the function B are selected, and then, one piece of state information (for example, B_L) is selected from among the selected pieces of state information. When the state information B_L is selected, a circuit based on the state information B_L (a circuit that achieves the function B) is achieved by the program array PE-ARRY as similar to the case of the state information A_L. Similarly, one piece of state information corresponding to each of the functions C to Z is sequentially selected, so that the circuits that achieve the functions C to Z are sequentially achieved by the program array PE-ARRY by selecting. In the manner, a circuit AA whose configuration changes from the function A to the function Z with the lapse of time is achieved by the program array PE-ARRY.

Hereinafter, each of the pieces of state information A_L, A_M, and A_S corresponding to the function A is also referred to as circuit-specific state information, and the pieces of circuit-specific state information A_L, A_M, and A_S are also collectively referred to as first state information. Each of the pieces of state information B_L, B_M, and B_S corresponding to the function B is also referred to as circuit-specific state information, and the pieces of circuit-specific state information B_L, B_M, and B_S are also collectively referred to as second state information.

<Three Pieces of State Information>

Figure 4:
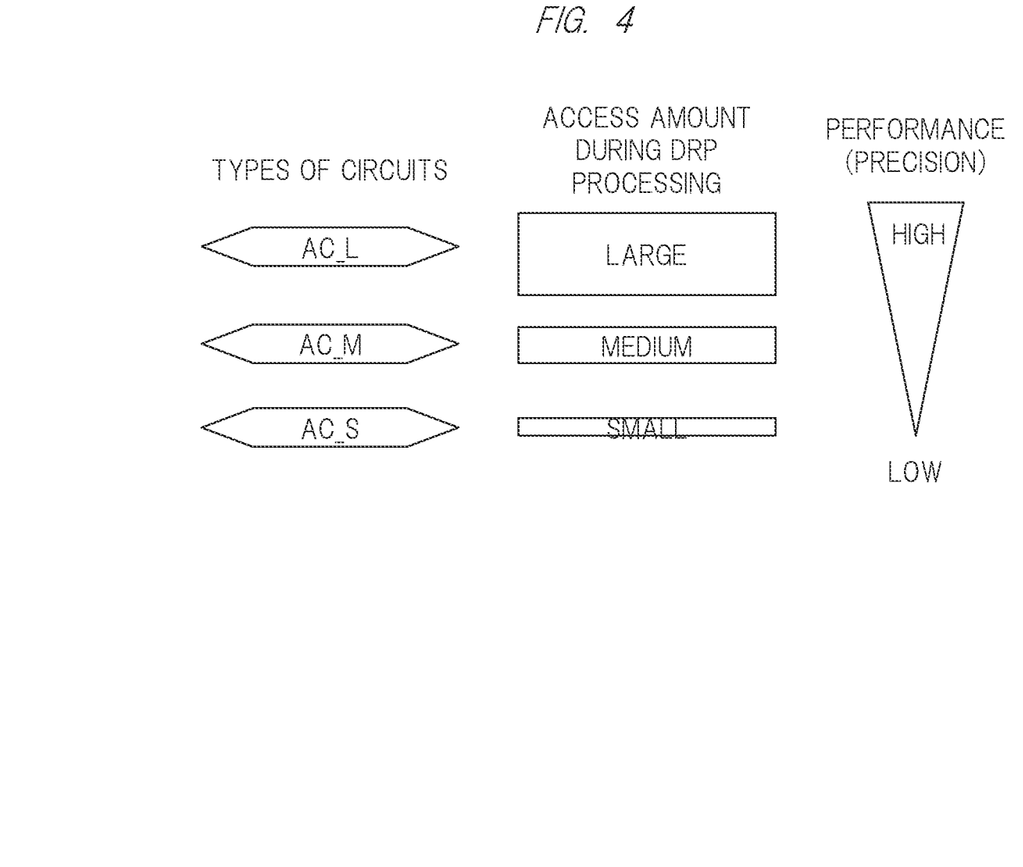
FIG. 4 is a diagram for explaining three pieces of state information according to the first embodiment.

Next, three pieces of state information corresponding to one function are described. FIG. 4 is a drawing for explaining the three pieces of state information according to the first embodiment.

Here, the three pieces of state information A_L, A_M, and A_S that achieve the function A will be explained as examples, but the same applies to the other pieces of state information.

The three pieces of state information A_L, A_M, and A_S are state information representing three types of circuits AC_L, AC_M, and AC_S that achieve mutually equivalent function A.

The state information A_S is the state information that causes the program array PE-ARRY to achieve a circuit in which the amount of access generated by the DMA controller DMAC (FIG. 2) is the smallest (small) when the corresponding circuit AC_S is operated. On the other hand, the state information A_L is the state information that causes the program array PE-ARRY to achieve a circuit in which the amount of access generated by the DMA controller DMAC is the largest (large) when the corresponding circuit AC_L is operated. Also, the state information A_M is the state information that causes the program array PE-ARRY to achieve a circuit in which the amount of access generated by the DMA controller DMAC is intermediate (medium) between the circuits AC_L and AC_S when the corresponding circuit AC_M is operated.

In the case of the circuit AC_L, a performance level is high because the amount of access is the largest. In contrast, in the case of the circuit AC_S, the performance level is low because the amount of access is the smallest. In the case of the circuit AC_M, the performance level is middle because the amount of access is intermediate.

Thus, as a configuration to change the amount of access, the circuit AC_L which has the largest amount of access is configured to handle the data to be processed at double precision (64 bits/data). As a result, the circuit AC_L uses a large amount of data, but the performance level can be made high. In contrast, the circuit AC_S which has the smallest amount of access is configured to handle the data to be processed at half precision (16 bits/data), and use a small amount of compressed (or, in the case of AI inference, pruned) data. The circuit AC_M which has a medium amount of access is configured to handle the data to be processed at single precision (32 bits/data).

In the first embodiment, the example of usage of three types of circuits as the circuits that achieve the equivalent function has been described. However, the number of types is not limited to this number. For example, two types or four or more types of circuits may be used as the circuits that achieve the equivalent function. Of course, in response to the number of types of circuits used, the number of pieces of state information that achieve the equivalent function may also be two types or four or more types, for example.

<Example of Operation of Semiconductor Device>

Figure 5:
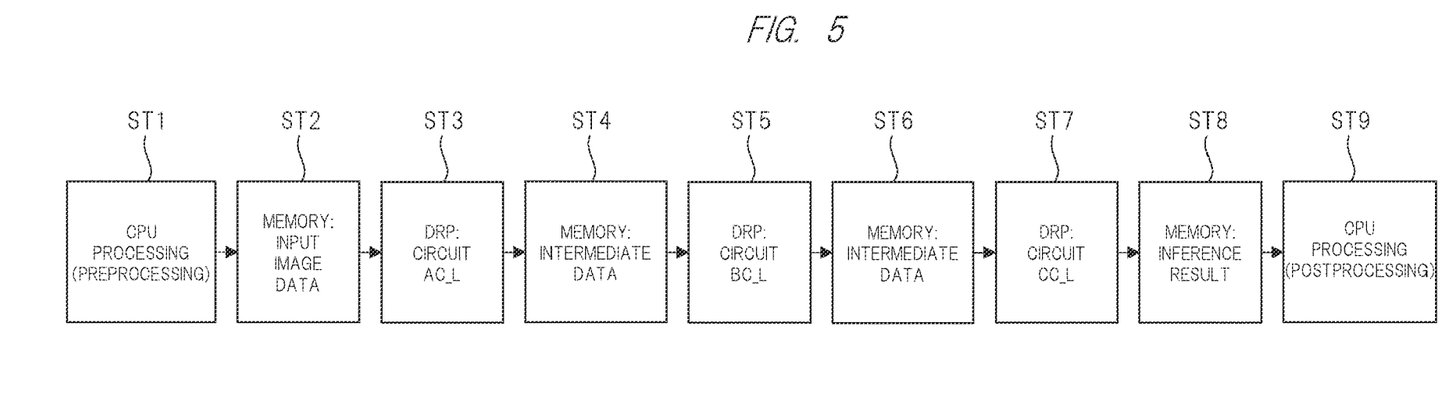
FIG. 5 is a diagram showing an example of an operation of a semiconductor device according to the first embodiment.
Figure 6:
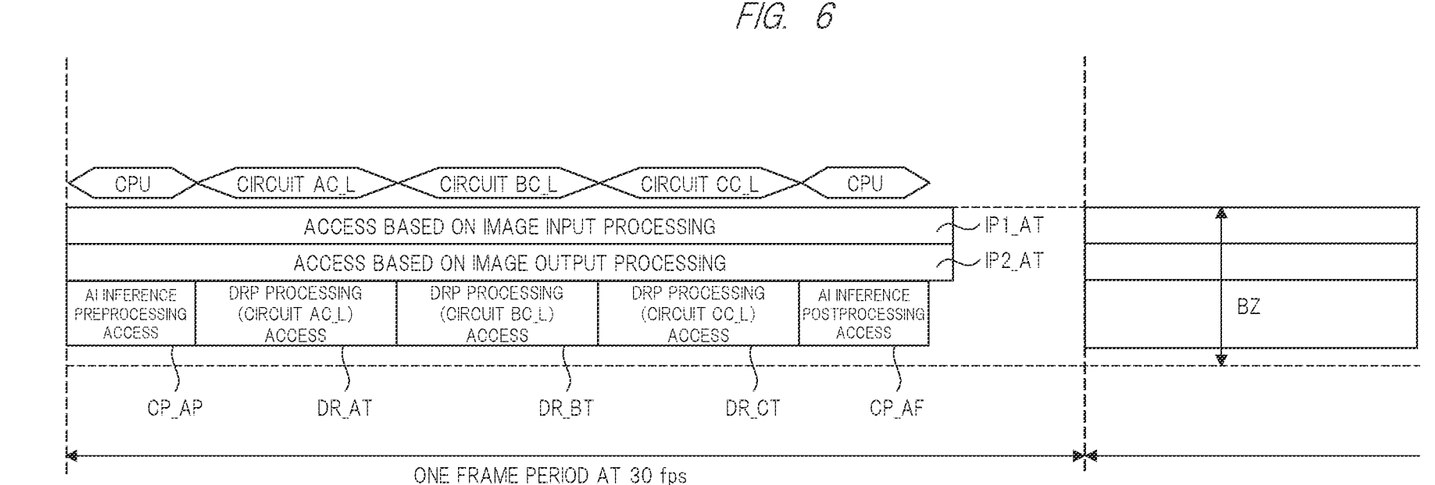
FIG. 6 is a diagram showing a memory access of a semiconductor device according to the first embodiment.

Next, an example of operation of the semiconductor device LSI shown in FIG. 1 will be described with reference to the drawings. FIG. 5 is a diagram showing the example of operation of the semiconductor device according to the first embodiment. FIG. 6 is a diagram showing the memory access of the semiconductor device according to the first embodiment. Here, explanation will be made in a case of the AI inference as an example in order to recognize a person-like object from a captured image (input image) while displaying the captured image on a display at the same time of the image capturing using an on-vehicle camera.

In order to achieve a circuit for executing AI inference, it is assumed that the circuit information AA_AP (FIG. 3) is already reloaded from the system memory S-MEM to the state memory ST-MEM of the DR processor DRP.

For ease of explanation, the explanation will be made in assumption that the circuit information AA_AP is made of pieces of state information A_L, A_M, A_S to C_L, C_M, C_S corresponding to the functions A to C, and assumption that pieces of state information A_L, B_L, C_L corresponding to circuits AC_L, BC_L, CC_L with the highest performance have been selected.

In order to achieve the AI inference, the semiconductor device LSI executes the following steps in order from step ST1 to step ST9.

First, in step ST1, the processor CPU executes pre-processing (CPU processing 1) on the input image. In step ST2, the input image data processed by the processor CPU is stored in the system memory S-MEM by the processor CPU.

In step ST3, the state information A_L is selected in the DR processor DRP, and the circuit AC_L is achieved by the program array PE-ARRY. In step ST3, input image data for AI inference is loaded from the system memory S-MEM into the circuit AC_L by the circuit AC_L and the DMA controller DMAC. In step ST4, the intermediate data generated by the circuit AC_L at this loading is stored in the system memory S-MEM by the DMA controller DMAC. In step ST4, the data obtained by the processing of the circuit AC_L is also transferred from the circuit AC_L to the system memory S-MEM, and is stored therein by the DMA controller DMAC.

In step ST5, the state information B_L is selected in the DR processor DRP, and the circuit BC_L is achieved by the program array PE-ARRY. In step ST5, the data stored in step ST4 is loaded from the system memory S-MEM into the circuit BC_L by the circuit BC_L and the DMA controller DMAC. The circuit BC_L executes operation for AI inference and the like on the loaded data. In step ST6, the intermediate data generated by the circuit BC_L during this operation is stored in the system memory S-MEM by the DMA controller DMAC. In step ST6, the data obtained by the operation by the circuit BC_L is also transferred from the circuit BC_L to the system memory S-MEM by the DMA controller DMAC, and is stored therein.

In step ST7, the state information C_L is selected in the DR processor DRP, and the circuit CC_L is achieved by the program array PE-ARRY. In step ST7, the data stored in step ST6 is loaded from the system memory S-MEM into the circuit CC_L by the circuit CC_L and the DMA controller DMAC. The circuit CC_L generates the inference result based on the loaded data. In step ST8, the inference result generated by the circuit CC_L is stored in the system memory S-MEM by the DMA controller DMAC.

After that, in step ST9, the processor CPU loads the inference result from the system memory S-MEM, and executes post-processing (CPU processing 2), and then, the result of the post-processing is displayed on, for example, the display.

Thus, in the circuits AC_L, BC_L and CC_L achieved by the DR processor DRP equipped with the DMA controller DMAC and program array PE-ARRY, access to transfer data to and from the system memory S-MEM occurs at each step. Also, the image processing circuits IP1 and IP2 included in the semiconductor device LSI (FIG. 1) also execute access to transfer data to and from the system memory S-MEM in order to process images.

FIG. 6 shows the memory access when steps ST1 to ST9 shown in FIG. 5 are executed.

In the drawing sheet of FIG. 6, the symbols "CPU", circuit "AC_L", circuit " ", circuit "CC_L", and "CPU" illustrated on the upper side, indicate circuit portions that are operating. FIG. 6 shows the period of access and the amount of access to the system memory S-MEM generated by the operation of the circuit portion of the processor CPU and the like. Here, the period of access is shown in the horizontal direction, and the amount of access is shown in the vertical direction. In FIG. 6, a symbol "BZ" indicates the bandwidth of the internal bus Int-BUS.

In FIG. 6, a symbol "IP1_AT" indicates the period during which the image processing circuit IP1 accesses the system memory S-MEM to execute image input processing, and the amount of access for this period. A symbol "IP2_AT" indicates the period during which the image processing circuit IP2 accesses the system memory S-MEM to execute image output processing, and the amount of access for this period. Since the image output from the on-vehicle camera is processed and is displayed on the display, each period during which the image processing circuits IP1 and IP2 access the system memory S-MEM is about one frame period (one frame at 30 frames per second (30 fps)), as shown in FIG. 6.

In FIG. 6, a symbol "CP_AP" indicates the period of access to the system memory S-MEM generated by the pre-processing (step ST1 in FIG. 5) executed by the processor CPU and the amount of access for this period, and a symbol "CP_AF" indicates the period of access to the system memory S-MEM generated by the post-processing (step ST9 in FIG. 5) executed by the processor CPU and the amount of access for this period.

In FIG. 6, a symbol "DR_AT" indicates the period of access to the system memory S-MEM generated by the circuit AC_L achieved by the program array PE-ARRY and the amount of access for this period, and a symbol "DR_BT" indicates the period of access to the system memory S-MEM generated by the circuit BC_L achieved by the program array PE-ARRY and the amount of access for this period. Furthermore, a symbol "DR_CT" indicates the period of access to the system memory S-MEM generated by the circuit CC_L achieved by the program array PE-ARRY and the amount of access for this period.

As shown in FIG. 6, even if the access generated by the image processing circuits IP1 and IP2 and the access generated by the circuit achieved by the program array PE-ARRY occur simultaneously, access in any circuit is not limited as long as the amount of access is within the range of the bus bandwidth BZ as shown in FIG. 6, and an issue such as performance reduction does not arise.

COMPARATIVE EXAMPLE

Next, an example of the performance reduction will be described as a comparative example.

Figure 7A:
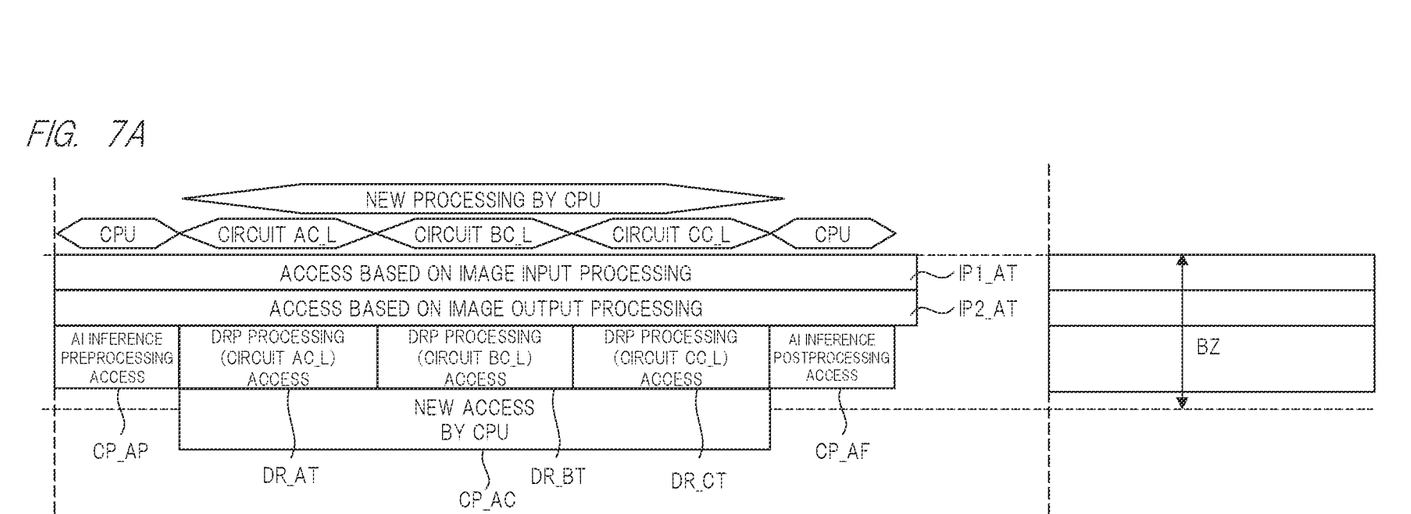
FIG. 7A is a diagram for explaining a comparative example.
Figure 7B:
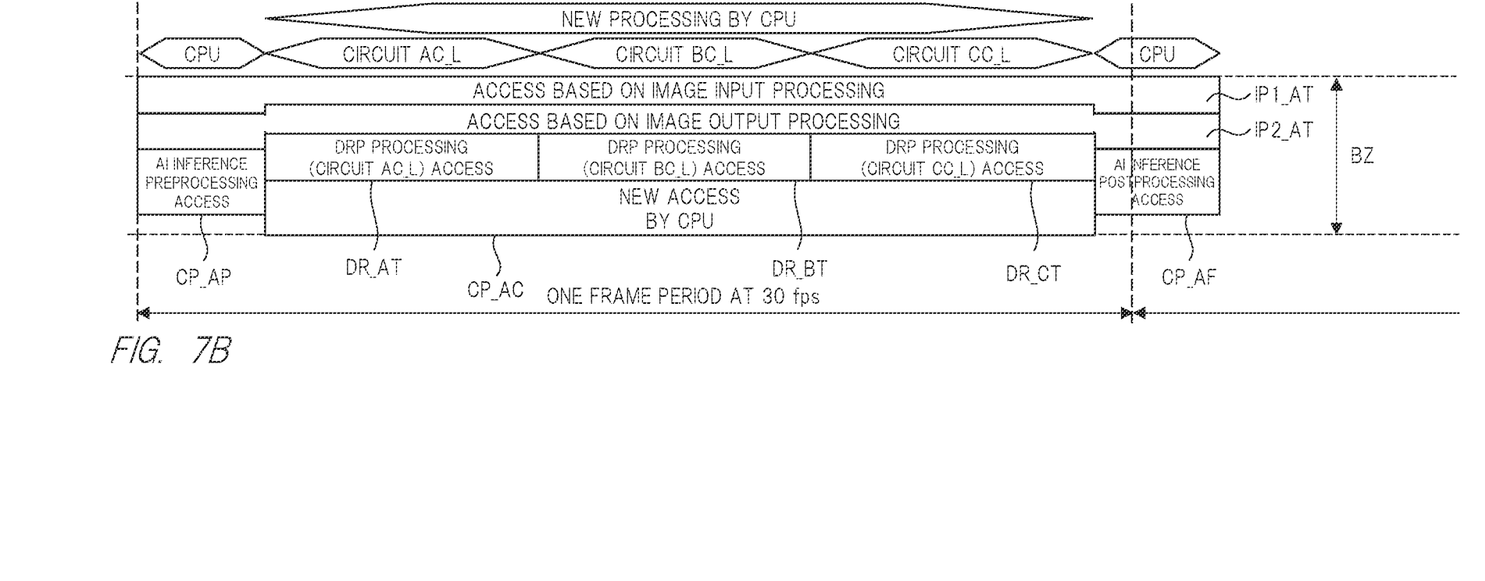
FIG. 7B is a diagram for explaining a comparative example.

FIG. 7 is a diagram for explaining a comparative example. FIG. 7A is similar to FIG. 6. The difference in FIG. 7A is a new processing executed by the processor CPU in one frame period. This new processing corresponds to, for example, the processing executed by the processor CPU in order to execute, for example, the processing corresponding to the operation for the on-vehicle system by the passenger.

In order to execute the new processing, the processor CPU accesses the system memory S-MEM in one frame period. The period and the amount of this access are shown in FIG. 7A as the symbol CP AC. As shown in FIG. 7A, the access period generated along with the new processing by the processor CPU overlaps with the access period IP1_AT based on the image input processing, the access period IP2_AT based on the image output processing, and the access periods DR_AT, DR_BT, and DR_CT based on the circuit achieved by the program array PE-ARRY, and the amount of access generated along with the new processing by the processor CPU is also large. For this reason, the amount of access to the system memory S-MEM by the processor CPU, the image processing circuits IP1 and IP2, and the DR processor DRP exceeds the bus bandwidth BZ.

In practice, the bus arbiter BUS-AB (FIG. 1) executes the arbitration among the accesses of the processor CPU, the image processing circuits IP1 and IP2, and the DR processor DRP. As shown in FIG. 7B, by this arbitration, the processor CPU, the image processing circuits IP1 and IP2, and the DR processor DRP are operated so that the amounts of accesses to the system memory S-MEM by the processor CPU, the image processing circuits IP1 and IP2, and the DR processor DRP do not exceed the bus bandwidth BZ.

For example, in consideration while taking the image output processing executed by the image processing circuit IP2 as an example, access to the system memory S-MEM is awaited by the arbitration of the bus arbiter BUS-AB. Similarly, in other circuits as well, access to the system memory S-MEM is awaited by the arbitration. Since access is awaited, a situation as shown in FIG. 7B where a series of processing is not completed in one frame period occurs. For example, as shown in FIG. 7B, the image output processing is not completed in one frame period, and it is difficult to execute the desired display on the display. That is, the performance of the semiconductor device is reduced.

<Selection of State Information>

In the first embodiment, the state information to be selected next is determined based on the frequency (denial frequency) at which access to the system memory S-MEM by the DR processor DRP is denied by the bus arbiter BUS-AB. For example, during the period when the circuit achieving the function A is operating, the denial frequency is determined for access to the system memory by the DR processor DRP, and based on the determined denial frequency, the state information corresponding to the previously determined denial frequency is selected from among the three pieces of state information B_L, B_M, B_S corresponding to the function B to be executed next. As a result, after the operation of the circuit corresponding to the function A, the circuit (the circuit corresponding to the function B) having the configuration corresponding to the denial frequency determined in the operation of the circuit corresponding to the function A operates. In other words, the denial frequency determined for the previously operating circuit corresponding to the function A is estimated as the denial frequency for the circuit to be operated next, and a circuit having a configuration suitable for the estimated denial frequency is used as the circuit corresponding to the function B.

In the first embodiment, the denial frequency is determined by the frequency circuit FPC shown in FIG. 1. The frequency circuit FPC determines the denial frequency based on the bus request signal RQ_DR output by the DMA controller DMAC (FIG. 2) and the bus permission signal AC_DR input from the bus arbiter BUS-AB. That is, during the period in which the circuit achieving the function A is operating, the frequency circuit FPC determines the number of times of the bus request signals RQ_DR output by the DMAC controller DMC as the number of times of requests, access is denied (access is not permitted) by the bus permission signal AC_DR, and the frequency circuit FPC determines the number of times of waiting states as the number of denials. The frequency circuit FPC calculates the ratio between the number of times of denials and the number of times requests (that is the "number of denials"/"number of requests") as the denial frequency, and outputs it to the control circuit CTL (FIG. 2).

Figure 8:
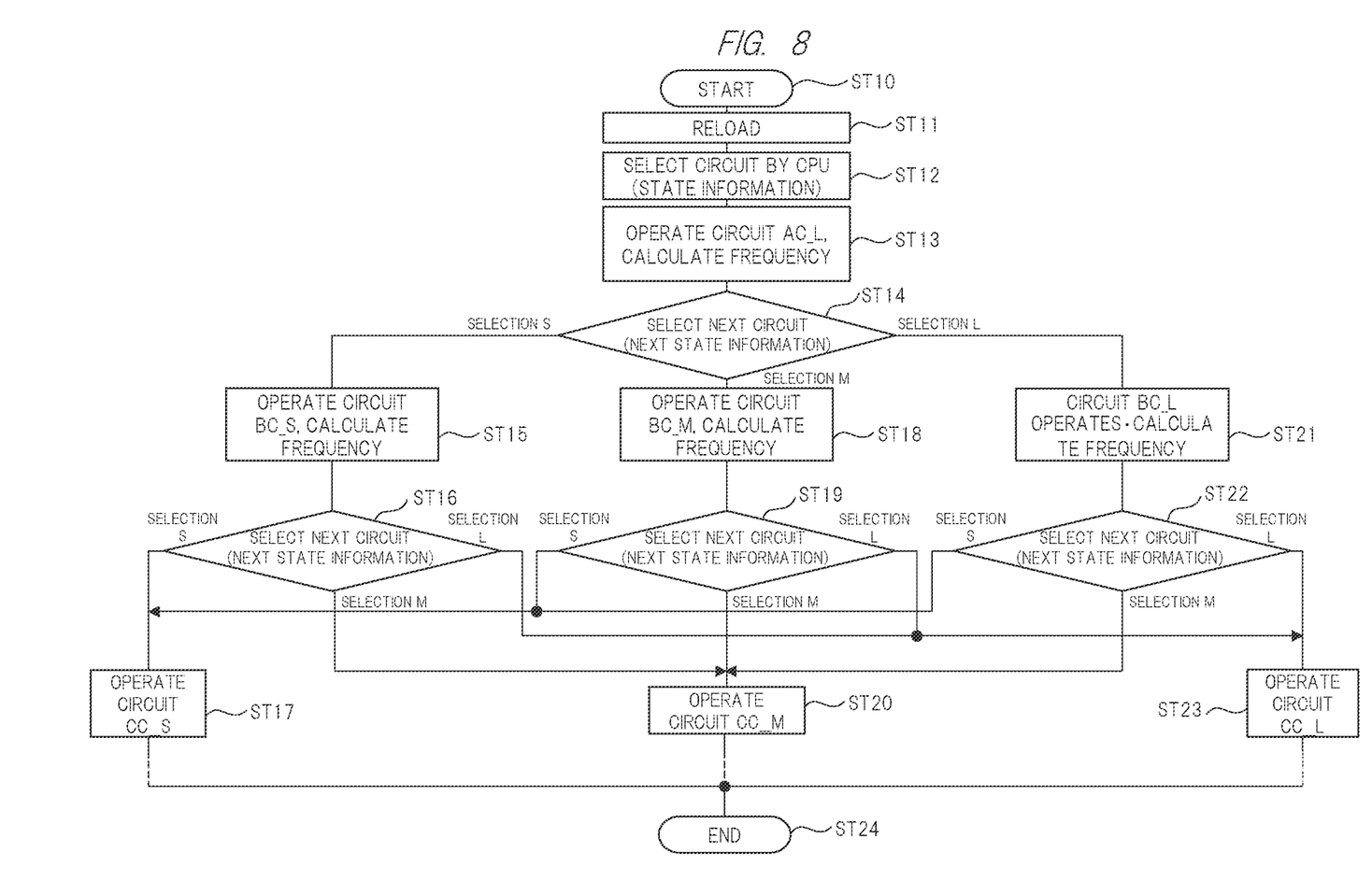
FIG. 8 is a flowchart showing an operation of selecting state information according to the first embodiment.

Next, an operation of selecting the state information is described with reference to the drawings. FIG. 8 is a flowchart showing the operation of selecting the state information according to the first embodiment.

Here, explanation will be made in a case where the control circuit CTL selects the state information corresponding to the denial frequency from the three pieces of state information by comparing, for example, two threshold values for the denial frequency and the input denial frequency. The two threshold values are a first threshold value in a case of the large denial frequency and a second threshold value in a case of the small denial frequency.

In FIG. 8, in step ST10, the DR processor DRP starts to operate. Next, in step ST11, the processor CPU reloads the circuit information AA_AP from the system memory S-MEM to the state memory ST-MEM.

In step ST12, the processor CPU selects the first state information. That is, it selects one piece of state information from among the three pieces of state information A_L, A_M, and A_S corresponding to the function A. FIG. 8 shows the case where the processor CPU has selected the state information A_L as the state information corresponding to the function A. The state information as the first state information may be selected by, for example, previously obtaining the denial frequency by the processor CPU, or a fixed state information may be selected. The state information A_L selected by the processor CPU is transferred to the control circuit CTL of the DR processor DRP. In this manner, the control circuit CTL selects the state information A_L stored in the state memory ST-MEM. As a result, in step ST13, the circuit AC_L corresponding to the state information A_L is achieved in the DR processor DRP, and the circuit AC_L operates. Also, in step ST13, the denial frequency is calculated by the frequency circuit FPC.

Next, in step ST14, the control circuit CTL selects the state information corresponding to the function B. In this selection, the control circuit CTL refers to the denial frequency calculated in step ST13. That is, if the denial frequency is larger than the above-described first threshold value, the control circuit CTL selects the state information B_S achieving the circuit BC_S which is a circuit having the small access amount (selection S). In contrast, if the denial frequency is smaller than the second threshold value, the control circuit CTL selects the state information B_L achieving the circuit BC_L which is a circuit having the large access amount (selection L). If the denial frequency is intermediate between the first and second threshold values, the control circuit CTL selects the state information B_M achieving the circuit BC_M which is a circuit having the medium access amount (selection M).

In the case of the selection S, in step ST15, the circuit BC_S corresponding to the state information B_S is achieved by the program array PE-ARRY in the DR processor DRP, and the circuit BC_S operates. Also, in step ST15, the denial frequency during the period of the operation of the circuit BC_S is calculated by the frequency circuit FPC.

In step ST16, the control circuit CTL compares the denial frequency calculated in step ST15 with the first and second threshold values, and selects the state information in accordance with the denial frequency from among the three pieces of state information C_L, C_M, and C_S corresponding to the function C (selection S, selection M, selection L).

In step ST16, if the selection is the selection S, step ST17 is executed next. In step ST17, the circuit CC_S corresponding to the state information C_S is achieved in the DR processor DRP, and the circuit CC_S operates. In step ST16, if the selection is the selection M, step ST20 is executed next. In step ST20, the circuit CC_M corresponding to the state information C_M is achieved in the DR processor DRP, and the circuit CC_M operates. Furthermore, in step ST16, if the selection is the selection L, step ST23 is executed next. In step ST23, the circuit CC_L corresponding to the state information C_L is achieved in the DR processor DRP, and the circuit CC_L operates.

After that, in step ST24, the DR processor DRP ends its operation.

In FIG. 8, steps ST18 and ST21 are similar to step ST15. The difference is that the circuit BC_M corresponding to the state information B_M is achieved in the DR processor DRP in step ST18 while the circuit BC_L corresponding to the state information B_L is achieved in the DR processor DRP in step ST21. Steps ST19 and ST22 are similar to step ST16.

FIG. 8 shows the example where the program array PE-ARRY achieves the circuits corresponding to the functions A to C in the DR processor DRP. However, as shown in FIG. 3, the circuits corresponding to the functions D to Z may be achieved. In this case, in step ST17 shown in FIG. 8, for example, the denial frequency is configured to be calculated as similar to step ST15.

In this manner, if the denial frequency is high in the previously operating circuit (such as the circuit AC_L), the circuit (BC_S) having the small access amount is used as the circuit to be operated next (circuit achieving the function B). If the denial frequency is low in the previously operating circuit, the circuit (BC_L) having the large access amount is used as the circuit to be operated next. If the denial frequency is medium in the previously operating circuit, the circuit (BC_M) having the medium access amount is used as the circuit to be operated next. As a result, if the denial frequency is small, the circuit having high performance is used next, or if the denial frequency is high, the circuit having the small access amount is used next, and therefore, the reduction in the performance of the semiconductor device can be suppressed.

Figure 9:
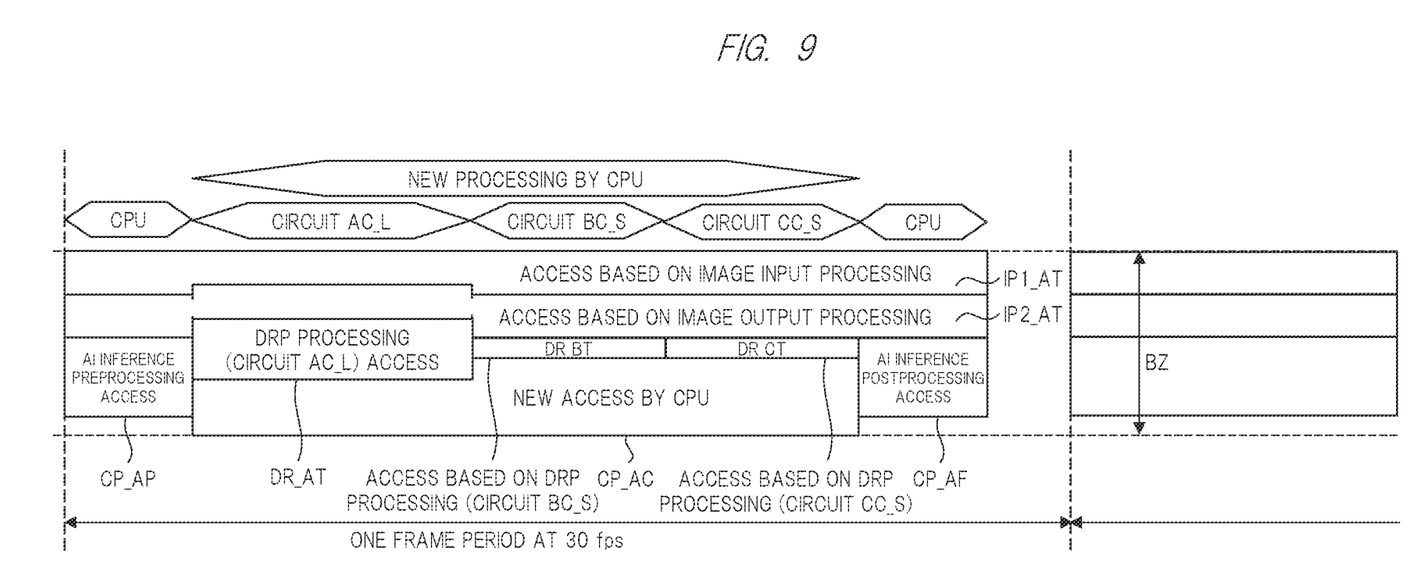
FIG. 9 is a diagram showing a memory access of a semiconductor device according to the first embodiment.

FIG. 9 is a diagram showing the memory access of the semiconductor device according to the first embodiment. FIG. 9 is similar to FIG. 7B. The difference is that the state information is selected in accordance with the flowchart shown in FIG. 8, that the circuit achieving the function B is made of the circuit BC_S having the small access amount, and that the circuit achieving the function C is also made of the circuit CC_S having the small access amount. In this manner, as shown in FIG. 9, the access amounts in the circuits (BC_S and CC_S) achieving the functions B and C are reduced. As a result, the waiting states of the processor CPU, the DR processor DRP, and the image processing circuits IP1 and IP2 due to the arbitration by the bus arbiter BUS-AB can be reduced, and a series of processes can be completed in one frame period. In addition, since the circuit having the performance level corresponding to the estimated denial frequency is selected, the circuit having the appropriate performance is executed. As a result, the reduction in the performance of the semiconductor device can be suppressed.

In the first embodiment, the frequency circuit FPC is achieved when the program array PE-ARRY in the DR processor DRP executes the state information corresponding to the frequency circuit FPC. Therefore, the state information A_L selected in step ST12 includes the state information corresponding to the circuit AC_L and the state information corresponding to the frequency circuit FPC. Similarly, the state information selected in step ST14 includes the state information corresponding to the circuit to be achieved and the state information corresponding to the frequency circuit FPC.

Second Embodiment

Figure 10:
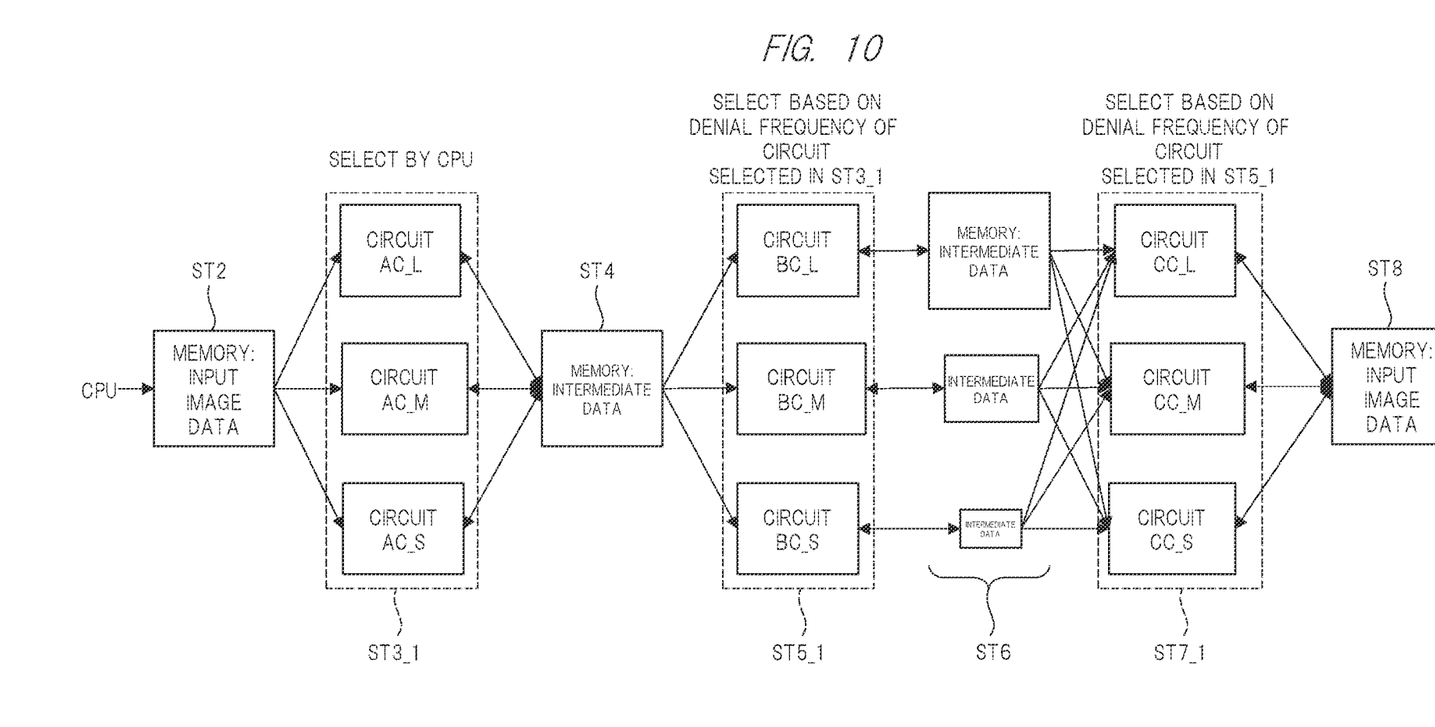
FIG. 10 is a diagram showing an example of an operation of a semiconductor device according to the second embodiment.

FIG. 10 is a diagram showing an example of operation of a semiconductor device according to the second embodiment. FIG. 10 is similar to steps ST2 to ST8 shown in FIG. 5. The main difference is that steps ST3, ST5, and ST7 are steps ST3_1, ST5_1, and ST7_1 in FIG. 10, respectively. Also, in FIG. 10, the line connecting the steps is clearly illustrated.

In FIG. 0.10, the input image data stored in the system memory S-MEM in step ST2 is loaded into the circuit (AC_L, AC_M, or AC_S) achieved by the state information A_L, A_M, or A_S selected by the processor CPU in step ST3_1, and is processed therein. In step ST5_1, the circuit (BC_L, BC_M, or BC_S) achieved by the state information B_L, B_M, or B_S loads the data from the system memory S-MEM, based on the denial frequency of the circuit selected in step ST3_1. Furthermore, in step ST7_1, the circuit (CC_L, CC_M, or CC_S) achieved by the state information C_L, C_M, or C_S loads the data from the system memory S-MEM, based on the denial frequency of the circuit selected in step ST5_1.

In the second embodiment, the circuits BC_L, BC_M, and BC_S achieved by three pieces of state information (for example, B_L, B_M, and B_S) are set to handle the data having the different bit size (width) from one another. For example, single data in the circuit BC_L is expressed at double precision (64 bits/data), single data in the circuit BC_M is expressed at single precision (32 bits/data), and single data in the circuit BC_S is expressed at half precision (16 bits/data). As a result, the bit size of the data supplied to the circuit in step ST7_1 via the system memory S-MEM varies depending on the type of the circuit selected in step ST5_1.

In the second embodiment, the circuits in the latter stage, that is, the three types of circuits achieved in step ST5_1 or/and step ST7_1 are configured to be able to process a plurality of bit sizes. In this manner, circuits (such as the circuit BC_S and circuit CC_L) having the different access amounts can be combined.

FIG. 10 shows the example where each of the circuits CC_L, CC_M, and CC_S can handle a plurality of bit sizes (64 bits, 32 bits, and 16 bits). However, the invention is not limited to this example. For example, state information achieving a circuit corresponding to each bit size may be prepared. In this case, nine pieces of state information may be prepared, and the control circuit CTL may select appropriate state information from among the nine pieces of state information while taking into account the denial frequency and the bit size of the circuit in the former stage to achieve an appropriate circuit.

In the embodiment, the example where the program array PE-ARRY in the DR processor DRP achieves the frequency circuit FPC by executing the state information corresponding to the frequency circuit FPC has been described. However, the present invention is not limited to this example. That is, a dedicated frequency circuit FPC may be configured in combination of a logic circuit or the like.

Regarding the frequency circuit FPC, the example of determining the denial frequency based on the bus request signal RQ_DR and the bus permission signal AC_DR has been described. However, the present invention is not limited to this example. For example, the denial frequency may be determined by counting the number of the waiting states in the access of the DMA controller DMAC (that is the number of times of generation of the waiting states). Alternatively, the time difference between the logical value of the data transfer rate of the DMA controller DMAC and the actual data transfer rate may be measured, and may be used as the denial frequency.

Of course, in the frequency circuit FPC, not the frequency of the access denial but the frequency of the access permission may be determined. In this case, if the frequency of the permission is low, the state information corresponding to the circuit having the small access amount may be selected. If the frequency of the permission is high, the state information corresponding to the circuit having the large access amount may be selected.

Furthermore, in the embodiment, the example of selecting the previously stored state information in the state memory ST-MEM in accordance with the denial frequency determined by the frequency circuit FPC has been described. However, the denial frequency determined by the frequency circuit FPC may be notified to the processor CPU. In this case, the processor CPU selects the circuit information corresponding to the notified denial frequency, and the processor CPU reloads the selected circuit information into the state memory ST-MEM. In this manner, the DR processor DRP achieves the circuit corresponding to the denial frequency, and the reduction in the performance of the semiconductor device LSI can be suppressed.

In the foregoing, the invention made by the inventors of the present application has been concretely described on the basis of the embodiments. However, it is needless to say that the present invention is not limited to the foregoing embodiments, and various modifications can be made within the scope of the present invention.

What is claimed is:

1. A semiconductor device comprising:
a processor;
a dynamically reconfigurable processor including a DMA controller and being dynamically reconfigurable;
a memory;
an internal bus to which the processor, the dynamically reconfigurable processor, and the memory are connected; and
a bus arbiter connected to the processor and the dynamically reconfigurable processor, the bus arbiter executing arbitration between access to the memory by the processor and access to the memory by the DMA controller of the dynamically reconfigurable processor in accordance with a predetermined priority order,
wherein the dynamically reconfigurable processor includes a frequency circuit determining a frequency at which the access to the memory by the DMA controller is denied by the arbitration made by the bus arbiter.

2. The semiconductor device according to claim 1,
wherein the dynamically reconfigurable processor includes a plurality of programmable circuits and a state memory storing state information controlling a function of each of the plurality of programmable circuits and connection between the plurality of programmable circuits, and the dynamically reconfigurable processor achieves a circuit in accordance with the state information,
wherein the state memory stores a plurality of pieces of state information achieving a mutually equivalent function and differing from each other in an amount of the access to the memory, and
wherein the state information corresponding to the frequency is selected from among the plurality of pieces of state information in accordance with the frequency determined by the frequency circuit, and the dynamically reconfigurable processor achieves a circuit in accordance with the selected state information.

3. The semiconductor device according to claim 2 further comprising an image processing circuit enabled to be a bus master connected to the internal bus and the bus arbiter,
wherein the bus arbiter executes arbitration among the access to the memory by the processor, the access to the memory by the DMA controller, and access to the memory by the image processing circuit enabled to be the bus master in accordance with a predetermined priority order.

4. The semiconductor device according to claim 1,
wherein the dynamically reconfigurable processor includes a plurality of programmable circuits and a state memory storing first state information and second state information controlling a function of each of the plurality of programmable circuits and connection between the plurality of programmable circuits,
wherein the dynamically reconfigurable processor achieves a circuit in accordance with the first state information, and then, achieves a circuit in accordance with the second state information,
wherein the second state information is a plurality of pieces of state information achieving a mutually equivalent function, and includes a plurality of pieces of circuit-specific state information differing from each other in an amount of the access to the memory, and
wherein the frequency circuit determines the frequency and selects circuit-specific state information corresponding to the frequency from among the plurality of pieces of circuit-specific state information in accordance with the determined frequency while the dynamically reconfigurable processor achieves a circuit in accordance with the first state information, and then, the dynamically reconfigurable processor achieves a circuit in accordance with the selected circuit-specific state information.

5. The semiconductor device according to claim 4,
wherein a width of data handled is different among circuits achieved by the plurality of pieces of circuit-specific state information.

6. The semiconductor device according to claim 4,
wherein the first state information is a plurality of pieces of state information achieving a mutually equivalent function, and includes a plurality of pieces of circuit-specific state information differing from each other in an amount of the access to the memory, and
wherein the processor selects predetermined circuit-specific state information from among the plurality of pieces of circuit-specific state information in the first state information, and the dynamically reconfigurable processor achieves a circuit in accordance with the selected circuit-specific state information.

7. The semiconductor device as set forth in claim 6 further comprising an image processing circuit enabled to be a bus master connected to the internal bus and the bus arbiter,
wherein the bus arbiter executes arbitration among the access to the memory by the processor, the access to the memory by the DMA controller, and access to the memory by the image processing circuit enabled to be the bus master, in accordance with a predetermined priority order.

8. A method of controlling a semiconductor device including: a processor; a dynamically reconfigurable processor including a DMA controller and being dynamically reconfigurable; a system memory; a bus to which the processor, the dynamically reconfigurable processor, and the system memory are connected; and a bus arbiter connected to the processor and the dynamically reconfigurable processor,
wherein the dynamically reconfigurable processor includes a plurality of programmable circuits and a state memory storing first state information and second state information controlling a function of each of the plurality of programmable circuits and connection between the plurality of programmable circuits,
wherein the second state information is a plurality of pieces of state information achieving a mutually equivalent function, and includes a plurality of pieces of circuit-specific state information differing from each other in an amount of access to the system memory,
wherein, during a period in which a function in accordance with the first state information is achieved, the dynamically reconfigurable processor determines a frequency at which access to the system memory by the DMA controller of the dynamically reconfigurable processor is not allowed by arbitration made by the bus arbiter, and
wherein the dynamically reconfigurable processor selects a circuit-specific state information corresponding to the frequency from among the plurality of pieces of circuit-specific state information in accordance with the determined frequency, and achieves a circuit in accordance with the selected circuit-specific state information.

9. The method of controlling the semiconductor device according to claim 8,
wherein the first state information is a plurality of pieces of state information achieving a mutually equivalent function, and includes a plurality of pieces of circuit-specific state information differing from each other in an amount of the access to the system memory, and
wherein, before determining the frequency, the processor selects predetermined circuit-specific state information from among the plurality of pieces of circuit-specific state information in the first state information, and the dynamically reconfigurable processor achieves a circuit in accordance with the selected circuit-specific state information.

10. The method of controlling the semiconductor device according to claim 8,
wherein a width of data handled is different among circuits achieved by the plurality of pieces of circuit-specific state information.

* * * * *